US012439011B2

(12) United States Patent
Kurozuka

(10) Patent No.: US 12,439,011 B2
(45) Date of Patent: Oct. 7, 2025

(54) IMAGE PROJECTION APPARATUS

(71) Applicant: Panasonic Automotive Systems Co., Ltd., Kanagawa (JP)

(72) Inventor: Akira Kurozuka, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 18/644,893

(22) Filed: Apr. 24, 2024

(65) Prior Publication Data

US 2024/0275927 A1    Aug. 15, 2024

Related U.S. Application Data

(63) Continuation of application No. PCT/JP2022/039373, filed on Oct. 21, 2022.

(30) Foreign Application Priority Data

Oct. 27, 2021  (JP) .................................. 2021-175932

(51) Int. Cl.
*H04N 9/31*    (2006.01)
(52) U.S. Cl.
CPC ......... *H04N 9/3161* (2013.01); *H04N 9/3158* (2013.01)
(58) Field of Classification Search
CPC ........................ H04N 9/3161; H04N 9/3158
See application file for complete search history.

(56) References Cited

U.S. PATENT DOCUMENTS

2003/0039036 A1\*  2/2003  Kruschwitz .......... H04N 9/3132
                                                                         359/623
2011/0043768 A1    2/2011  Nakayama et al.
(Continued)

FOREIGN PATENT DOCUMENTS

JP    2003-98476     4/2003
JP    2009-276586   11/2009
(Continued)

OTHER PUBLICATIONS

International Search Report issued in International Pat. Appl. No. PCT/JP2022/039373, dated Dec. 20, 2022, along with an English translation thereof.

(Continued)

*Primary Examiner* — Yassin Alata
(74) *Attorney, Agent, or Firm* — Greenblum & Bernstein, P.L.C.

(57)  ABSTRACT

An image projection apparatus includes: a plurality of light sources configured to respectively emit laser lights of colors different from each other; at least one display element configured to modulate each of the laser lights emitted from the plurality of light sources, on the basis of a video signal; an illumination optical system configured to guide the laser lights emitted from the plurality of light sources, to the display element; and a projection lens configured to project the laser lights modulated by the display element. The illumination optical system separately includes: an optical element of a first system configured to uniformize an intensity distribution of one of the laser lights and guide resultant laser light to the display element; and an optical element of a second system configured to uniformize an intensity distribution of another of the laser lights and guide resultant laser light to the display element.

8 Claims, 12 Drawing Sheets

(56) References Cited

U.S. PATENT DOCUMENTS

| | | |
|---|---|---|
| 2013/0003343 A1 | 1/2013 | Sudarshanam et al. |
| 2013/0271673 A1 | 10/2013 | Katou |
| 2014/0043589 A1 | 2/2014 | Chifu et al. |
| 2015/0194783 A1 | 7/2015 | Tu et al. |
| 2016/0073072 A1 | 3/2016 | Tanaka |
| 2016/0085083 A1 | 3/2016 | Murota |
| 2018/0045976 A1 | 2/2018 | Lee |

FOREIGN PATENT DOCUMENTS

| | | |
|---|---|---|
| JP | WO2012/086011 | 6/2012 |
| JP | 2014-164175 | 9/2014 |
| JP | 2016-066060 | 4/2016 |
| WO | 2010/116727 | 10/2010 |
| WO | 2012/143990 | 10/2012 |
| WO | 2015/141164 | 9/2015 |

OTHER PUBLICATIONS

Office Action issued in Corresponding JP Patent Application No. 2021-175932, dated Mar. 18, 2025, along with an English translation thereof.

* cited by examiner

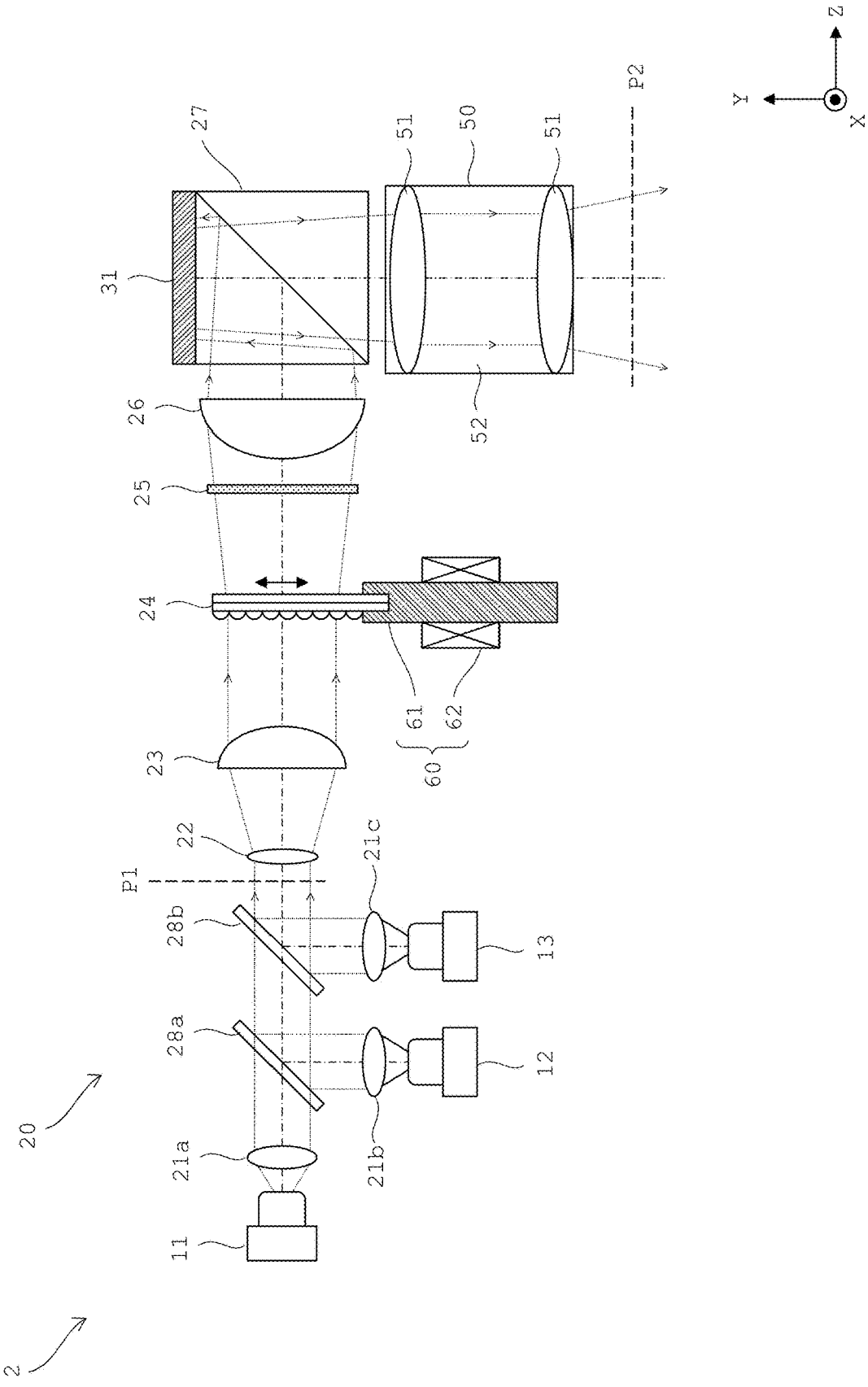
FIG.2 COMPARATIVE EXAMPLE

<RED>

<GREEN>

<BLUE>

IMAGE PROJECTION APPARATUS

CROSS REFERENCE TO RELATED APPLICATION

This application is a continuation of International Application No. PCT/JP2022/039373 filed on Oct. 21, 2022, entitled "IMAGE PROJECTION APPARATUS", which claims priority under 35 U.S.C. Section 119 of Japanese Patent Application No. 2021-175932 filed on Oct. 27, 2021, entitled "IMAGE PROJECTION APPARATUS". The disclosures of the above applications are incorporated herein by reference.

BACKGROUND OF THE INVENTION

Field of the Invention

The present invention relates to an image projection apparatus that projects light modulated by a video signal.

Description of Related Art

An image projection apparatus that projects an image on a wall in a room or a screen installed in a room has been known. In an image projection apparatus mounted on a vehicle, an image is projected and displayed on a windshield in front of the driver's seat. Japanese Laid-Open Patent Publication No. 2009-276586 describes an image projection apparatus that projects an image by using two reflection-type liquid crystal panels.

In an image projection apparatus, a plurality of light sources that respectively emit laser lights of red, green, and blue can be used. In this case, for example, the laser lights emitted from the respective light sources are integrated by an illumination optical system, and guided to a common display element such as a liquid crystal panel.

However, in this configuration, when the beam profiles of the laser lights emitted from the respective light sources are different from each other, if the illumination optical system is made appropriate with respect to any one of the laser lights, color unevenness due to other laser lights is caused in the projection image. On the other hand, in order to suppress color unevenness in the projection image with respect to all of the laser lights, if, for example, the diffusion angle of a diffusion plate included in the illumination optical system is set to be large, power loss is caused in the laser lights from the respective light sources, whereby the utilization efficiency of the laser lights decreases.

SUMMARY OF THE INVENTION

A main aspect of the present invention relates to an image projection apparatus. The image projection apparatus according to the present aspect includes: a plurality of light sources configured to respectively emit laser lights of colors different from each other; at least one display element configured to modulate each of the laser lights emitted from the plurality of light sources, on the basis of a video signal; an illumination optical system configured to guide the laser lights emitted from the plurality of light sources, to the display element; and a projection lens configured to project the laser lights modulated by the display element. The illumination optical system separately includes: an optical element of a first system configured to uniformize an intensity distribution of one of the laser lights and guide resultant laser light to the display element; and an optical element of a second system configured to uniformize an intensity distribution of another of the laser lights and guide resultant laser light to the display element.

In the image projection apparatus according to the present aspect, one laser light and another laser light are separately uniformized by the optical element of the first system and the optical element of the second system, respectively. Therefore, with respect to the one laser light and the other laser light, the optical element of the first system and the optical element of the second system are easily made appropriate, respectively. Therefore, as compared with a case where all of the laser lights are uniformized by the optical element of a single system, while decrease in the utilization efficiency of the laser light from each light source is suppressed, one laser light and the other laser light can be appropriately uniformized.

The effects and the significance of the present invention will be further clarified by the description of the embodiment below. However, the embodiment below is merely an example for implementing the present invention. The present invention is not limited to the description of the embodiment below in any way.

BRIEF DESCRIPTION OF THE DRAWINGS

FIG. 2 is a plan view showing a configuration of an optical system of an image projection apparatus according to Comparative Example;

Figure 1:
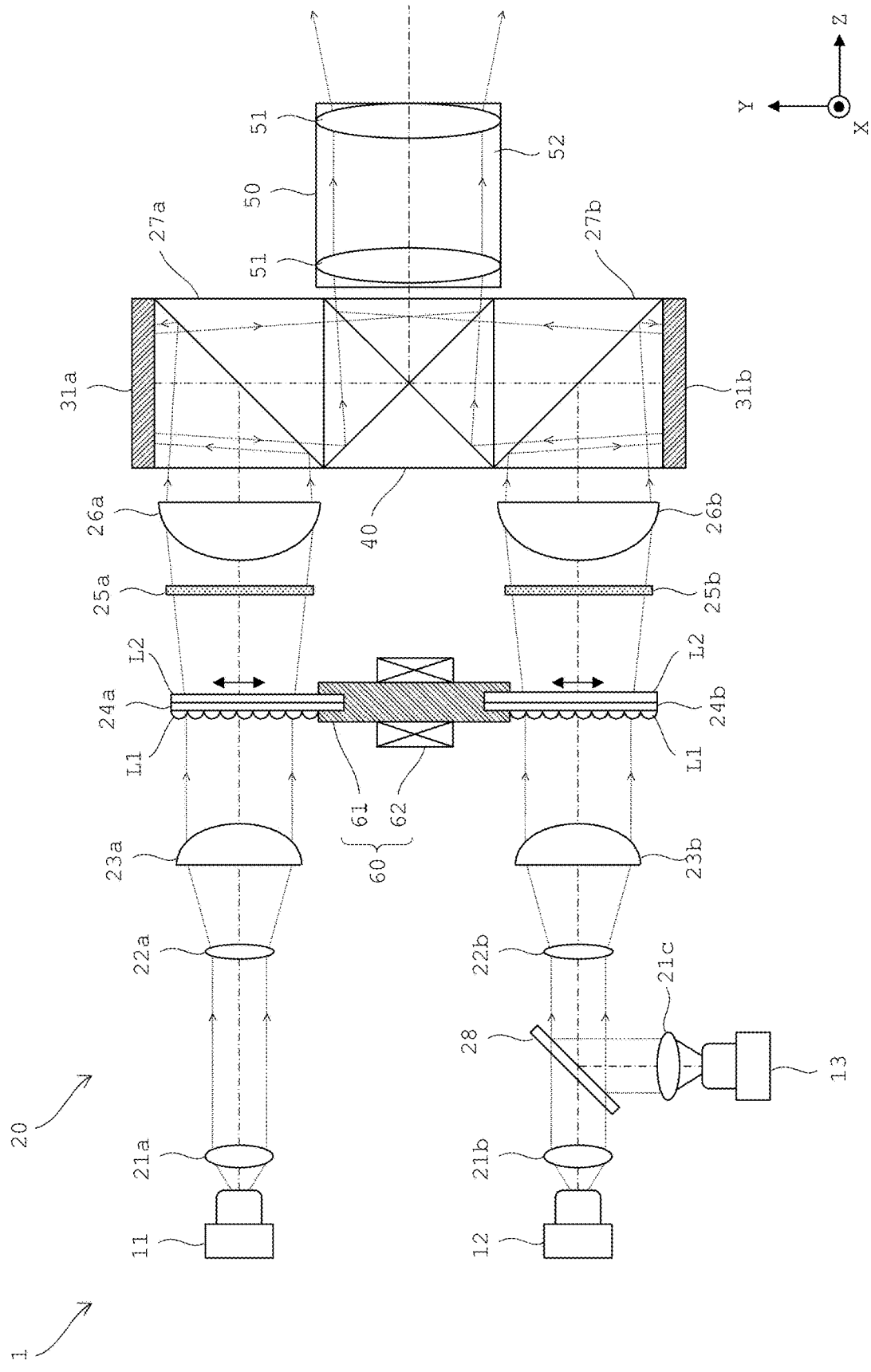
FIG. 1 is a plan view showing a configuration of an optical system of an image projection apparatus according to an embodiment.

It is noted that the drawings are solely for description and do not limit the scope of the present invention in any way.

DETAILED DESCRIPTION

Hereinafter, an embodiment of the present invention will be described with reference to the drawings. For convenience, X-, Y-, and Z-axes orthogonal to each other are indicated in the drawings. The Z-axis positive direction is the projection direction of laser light modulated by a video signal, and the X-axis direction is the up-down direction of the optical system.

FIG. 1 is a plan view showing a configuration of an optical system of an image projection apparatus 1. In FIG. 1, the optical axes of the optical system are indicated by alternate long and short dash lines, and advancement of laser light of each color is schematically indicated by a dotted line.

The image projection apparatus 1 includes, as components of the optical system: light sources 11 to 13; an illumination optical system 20; display elements 31a, 31b; a combining element 40; and a projection lens unit 50. Further, the image projection apparatus 1 includes an actuator 60 that vibrates cylindrical lens arrays 24a, 24b, in the Y-axis direction.

The light sources 11, 12, 13 emit laser lights in a red wavelength band, a green wavelength band, and a blue wavelength band, respectively. The light sources 11, 12, 13 are each a semiconductor laser, for example. The light sources 11, 12 each emit laser light in the Z-axis positive direction, and the light source 13 emits laser light in the Y-axis positive direction. The emission optical axes of the light sources 11, 12, 13 are included in the same plane parallel to a Y-Z plane. The light source 11 is disposed such that the polarization direction corresponds to S-polarization with respect to the polarizing surface of a polarizing beam splitter 27a, and the light sources 12, 13 are disposed such that the polarization direction corresponds to S-polarization with respect to the polarizing surface of a polarizing beam splitter 27b.

The illumination optical system 20 guides the laser lights of the respective colors emitted from the light sources 11, 12, 13, to the display elements 31a, 31b. The illumination optical system 20 includes: collimator lenses 21a to 21c; fly-eye lenses 22a, 22b; collimator lenses 23a, 23b; the cylindrical lens arrays 24a, 24b; diffusion plates 25a, 25b; field lenses 26a, 26b; the polarizing beam splitters 27a, 27b; and a dichroic mirror 28.

The collimator lenses 21a to 21c converge laser lights emitted from the light sources 11 to 13 into substantially collimated lights, respectively. The dichroic mirror 28 allows the laser light in the green wavelength band having passed through the collimator lens 21b to pass therethrough, and reflects the laser light in the blue wavelength band having passed through the collimator lens 21c. The dichroic mirror 28 is disposed at a position where the emission optical axes of the light sources 12, 13 cross each other. The optical axis of the light source 13 is aligned with the optical axis of the light source 12 by the dichroic mirror 28. Accordingly, the laser light in the green wavelength band and the laser light in the blue wavelength band advance via the dichroic mirror 28 and then in the same optical path in the Z-axis positive direction.

The fly-eye lens 22a, 22b uniformizes the intensity distribution of laser light incident thereon. The fly-eye lens 22a, 22b is implemented by a microlens array in which a large number of microlenses are disposed in a matrix shape. Laser light incident on each microlens of the fly-eye lens 22a is diffused through the collimator lens 23a so as to be spread over the entirety of the same incident region of the cylindrical lens array 24a. Similarly, laser light incident on each microlens of the fly-eye lens 22b is diffused through the collimator lens 23b so as to be spread over the entirety of the same incident region of the cylindrical lens array 24b.

Accordingly, in the incident regions of the cylindrical lens arrays 24a, 24b, the intensity distribution of laser light of each color is uniformized.

The collimator lens 23a, 23b collimates laser light incident from the fly-eye lens 22a, 22b, to guide the resultant laser light to the cylindrical lens array 24a, 24b.

On the incident surface and the emission surface of the cylindrical lens array 24a, 24b, a large number of cylindrical lenses L1, L2 are formed, respectively. On the incident surface of the cylindrical lens array 24a, 24b, a large number of cylindrical lenses L1 are formed such that the generatrix thereof is parallel to the X-axis. On the emission surface of the cylindrical lens array 24a, 24b, a large number of cylindrical lenses L2 are formed such that the generatrix thereof is parallel to the Y-axis.

When the cylindrical lens array 24a is viewed in the Z-axis direction, rectangular lens parts are formed in the regions where the cylindrical lenses L1 on the incident surface and the cylindrical lenses L2 on the emission surface cross each other. Each lens part converges the laser light in the Y-axis direction by the corresponding cylindrical lens L1 on the incident surface, and converges the laser light in the X-axis direction by the corresponding cylindrical lens L2 on the emission surface. Due to this lens action of each lens part and the lens action by the field lens 26a on the subsequent stage side, the laser light having passed through each lens part is guided to the display element 31a so as to be spread over the entirety of the display region of the display element 31a.

The convergence action of the cylindrical lenses L1 on the incident surface is enhanced by the convergence action of the cylindrical lenses L2 on the emission surface. Accordingly, the laser light having passed through each lens part has, on the incident surface of the display element 31a, a rectangular shape that is long in the Z-axis direction. In order to make this shape appropriate for the display region of the display element 31a, the convergence action of the cylindrical lenses L1 on the incident surface and the convergence action of the cylindrical lenses L2 on the emission surface are adjusted. That is, the cylindrical lens array 24a defines the illumination region of the laser light in the red wavelength band in the display element 31a.

The cylindrical lenses L1, L2 formed on the incident surface and the emission surface of the cylindrical lens array 24b, respectively, are also adjusted in a similar manner. The cylindrical lens array 24b defines the illumination region of the laser lights in the green and blue wavelength bands in the display element 31b.

The diffusion plate 25a, 25b diffuses the laser light incident from the cylindrical lens array 24a, 24b side, at a predetermined diffusion angle. On the incident surface or the emission surface of the diffusion plate 25a, 25b, a large number of fine lenses are formed with substantially no gap therebetween. Each of the laser lights is diffused by these lenses. Normally, the diffusion angle is set to about several degrees (e.g., about 1°). Due to the diffusing action of the diffusion plate 25a, 25b, the intensity distribution of the laser lights is further uniformized.

The polarizing beam splitters 27a, 27b reflect S-polarized components of the laser lights respectively incident from the sides of the field lenses 26a, 26b, to guide the S-polarized components to the display elements 31a, 31b, and allow P-polarized components of the laser lights respectively incident from the sides of the display elements 31a, 31b to pass therethrough, to guide the P-polarized components to the combining element 40.

The display elements 31a, 31b are each a liquid crystal panel of a reflection-type. The display element 31a, 31b changes, for each pixel, the polarization direction of the laser light incident on the display region, in accordance with the video signal. Accordingly, the amount of the laser light that passes through the polarizing beam splitter 27a, 27b changes for each pixel. Thus, the laser light of each color is modulated in accordance with the video signal.

The combining element 40 reflects each of the laser light incident from the polarizing beam splitter 27a side and the laser lights incident from the polarizing beam splitter 27b side into the Z-axis positive direction, thereby integrating the optical paths of the laser lights of the respective colors. The combining element 40 is a cross dichroic prism, for example.

The projection lens unit 50 projects the modulated laser lights of the respective colors incident from the combining element 40, in the Z-axis direction. The projection lens unit 50 includes: a plurality of projection lenses 51 for projecting the laser lights of respective colors; and a lens barrel 52 that holds these projection lenses 51.

The actuator 60 includes a supporter 61 and a drive part 62, and vibrates the supporter 61 in the Y-axis direction by driving the drive part 62. The drive part 62 is, for example, an electromagnetic actuator that drives the supporter 61 by electromagnetic force generated between a coil and a magnet. The drive part 62 may be configured to drive the supporter by another method.

In the optical system in FIG. 1, laser light in the red wavelength band modulated by the display element 31a on the basis of the video signal, and laser lights in the green and blue wavelength bands modulated by the display element 31b on the basis of the video signal are each projected by the projection lenses 51 through the combining element 40. Accordingly, on the subsequent stage side of the projection lens unit 50, a color projection image is displayed. At this time, the cylindrical lens arrays 24a, 24b are finely vibrated in the Y-axis direction by the actuator 60. Accordingly, speckle noise caused in the projection image due to interference of the laser lights is suppressed.

In the configuration in FIG. 1, the intensity distributions of the laser lights of the respective colors applied to the display regions of the display elements 31a, 31b are uniformized by the fly-eye lenses 22a, 22b, the cylindrical lens arrays 24a, 24b, the diffusion plates 25a, 25b, and the field lenses 26a, 26b. That is, the laser light in the red wavelength band emitted from the light source 11 is guided to the display element 31a, with the intensity distribution uniformized by the fly-eye lens 22a, the cylindrical lens array 24a, the diffusion plate 25a, and the field lens 26a. The laser lights in the green and blue wavelength bands emitted from the light sources 12, 13 are guided to the display element 31b, with the intensity distributions uniformized by the fly-eye lens 22b, the cylindrical lens array 24b, the diffusion plate 25b, and the field lens 26b.

As described above, in the present embodiment, the illumination optical system 20 separately includes: optical elements (the fly-eye lens 22a, the cylindrical lens array 24a, the diffusion plate 25a, and the field lens 26a) of a first system for uniformizing the laser light in the red wavelength band; and optical elements (the fly-eye lens 22b, the cylindrical lens array 24b, the diffusion plate 25b, and the field lens 26b) of a second system for uniformizing the laser lights in the green and blue wavelength bands. Accordingly, as described below, while decrease in the utilization efficiency of the laser lights is suppressed, color unevenness in a projection image can be effectively suppressed.

FIG. 2 is a plan view showing a configuration of an optical system of an image projection apparatus 2 according to Comparative Example.

In Comparative Example, the optical paths of laser lights in the red, green, and blue wavelength bands are integrated by two dichroic mirrors 28a, 28b. Then, the laser lights of the respective colors are guided through a fly-eye lens 22, a collimator lens 23, a cylindrical lens array 24, a diffusion plate 25, a field lens 26, and a polarizing beam splitter 27, which are used in common, to a common display element 31. The laser lights of the respective colors modulated by the display element 31 pass through the polarizing beam splitter 27, are incident on the projection lens unit 50, and are projected by the projection lenses 51. At this time, the cylindrical lens array 24 is finely vibrated in the Y-axis direction by the actuator 60, whereby speckle noise in a projection image is suppressed.

Here, in the configuration of Comparative Example, optical elements (the fly-eye lens 22, the cylindrical lens array 24, the diffusion plate 25, and the field lens 26) of the first system for uniformizing the intensity distributions of the laser lights of the respective colors are applied to the red, green, and blue laser lights. Therefore, in the configuration of Comparative Example, these optical elements need to be made appropriate with respect to the three types of laser lights of red, green, and blue.

However, the beam profiles of the laser lights respectively emitted from the light sources 11, 12, 13 may be different from each other.

For example, when a white image is generated by red, green, and blue laser lights, the light amount proportion of the laser light in the red wavelength band relative to the laser lights in the green and blue wavelength bands needs to be increased. On the other hand, in general, as for the light source 11 which emits the laser light in the red wavelength band, decrease in the emission power according to increase in temperature is significant as compared with those of the light sources 12, 13 which emit the laser lights in the green and blue wavelength bands. Therefore, in order to maintain the above light amount proportion even under high temperature, the maximum emission power of the light source 11 for red needs to be increased relative to those of the light sources 12, 13 for green and blue.

To meet such a requirement, the light source 11 for red can be implemented by, for example, a laser light source of a multi-light emission type in which three light emitting parts are arranged in a light emitting layer. On the other hand, the light sources 12, 13 for green and blue can be implemented by, for example, a laser light source of a single light emission type in which only one light emitting part is disposed in a light emitting layer. In this case, the beam profile of the laser light emitted from the light source 11 for red is significantly different from the beam profiles of the laser lights emitted from the light sources 12, 13 for green and blue.

Figure 3A:
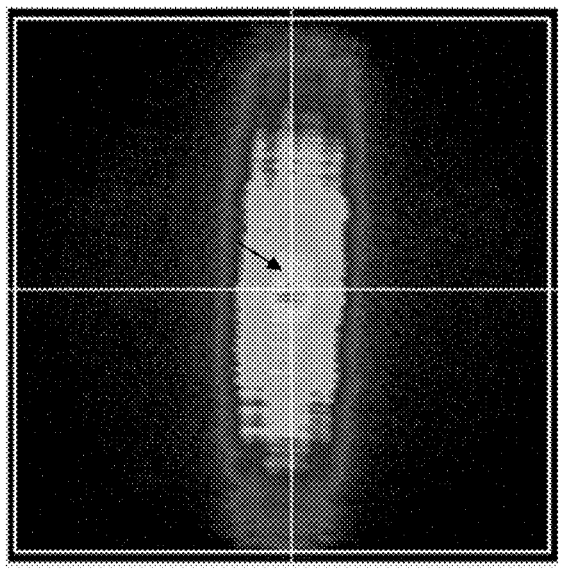
FIG. 3A to FIG. 3C respectively show beam profiles of laser lights emitted from light sources for red, green, and blue according to Comparative Example.
Figure 3B:
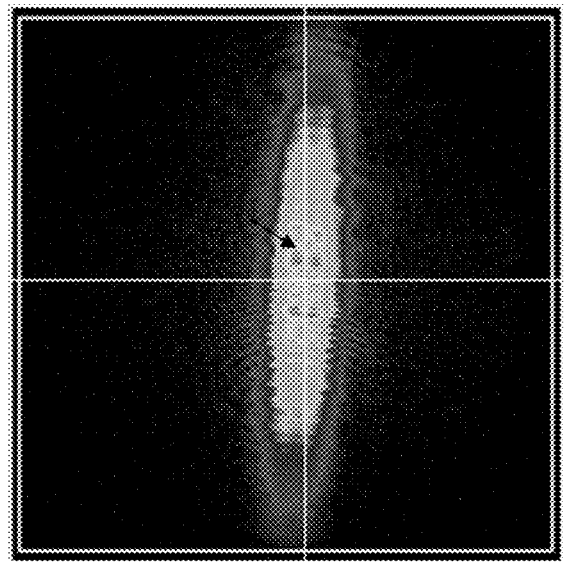
Figure 3C:
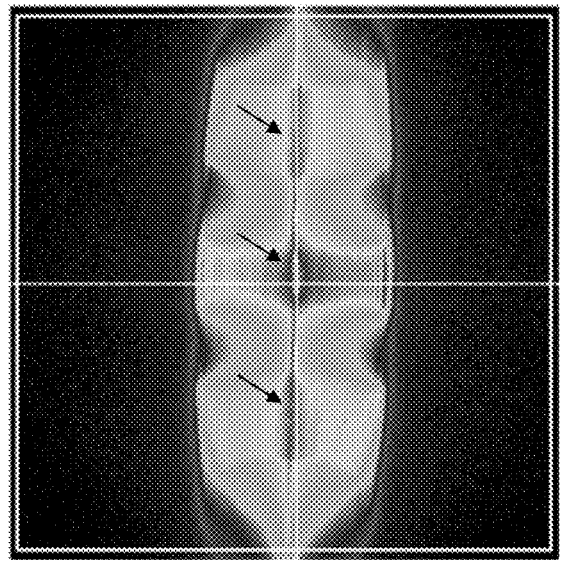

FIGS. 3A to 3C respectively show beam profiles (intensity distributions) at an observation plane P1 in FIG. 2 of the laser lights emitted from the light sources 11, 12, 13 for red, green and blue. For convenience, in FIGS. 3A to 3C, the color intensity distributions are converted to gray scale to be shown.

Here, since three light emitting parts are disposed in the light source 11, the beam profile of the laser light emitted from the light source 11 has three peaks (indicated by arrows in FIG. 3A) arranged in the X-axis direction, as shown in FIG. 3A. On the other hand, since only one light emitting part is disposed in each of the light sources 12, 13, the beam profile of the laser light emitted from each of the light sources 12, 13 has only one peak (indicated by an arrow in FIG. 3A) at the center, as shown in FIGS. 3B, 3C.

As shown in FIGS. 3B, 3C, the beam profiles of the green and blue laser lights are similar to each other. In contrast, the beam profile of the red laser light is significantly different from the beam profiles of the green and blue laser lights, as shown in FIG. 3A. Therefore, in the configuration of Comparative Example in FIG. 2, the optical elements (the fly-eye lens 22, the cylindrical lens array 24, the diffusion plate 25, and the field lens 26) of the above single system cannot be optimized with respect to all of the red, green, and blue laser lights. As a result, color unevenness is caused in the projection image projected from the projection lenses 51.

Figure 4:
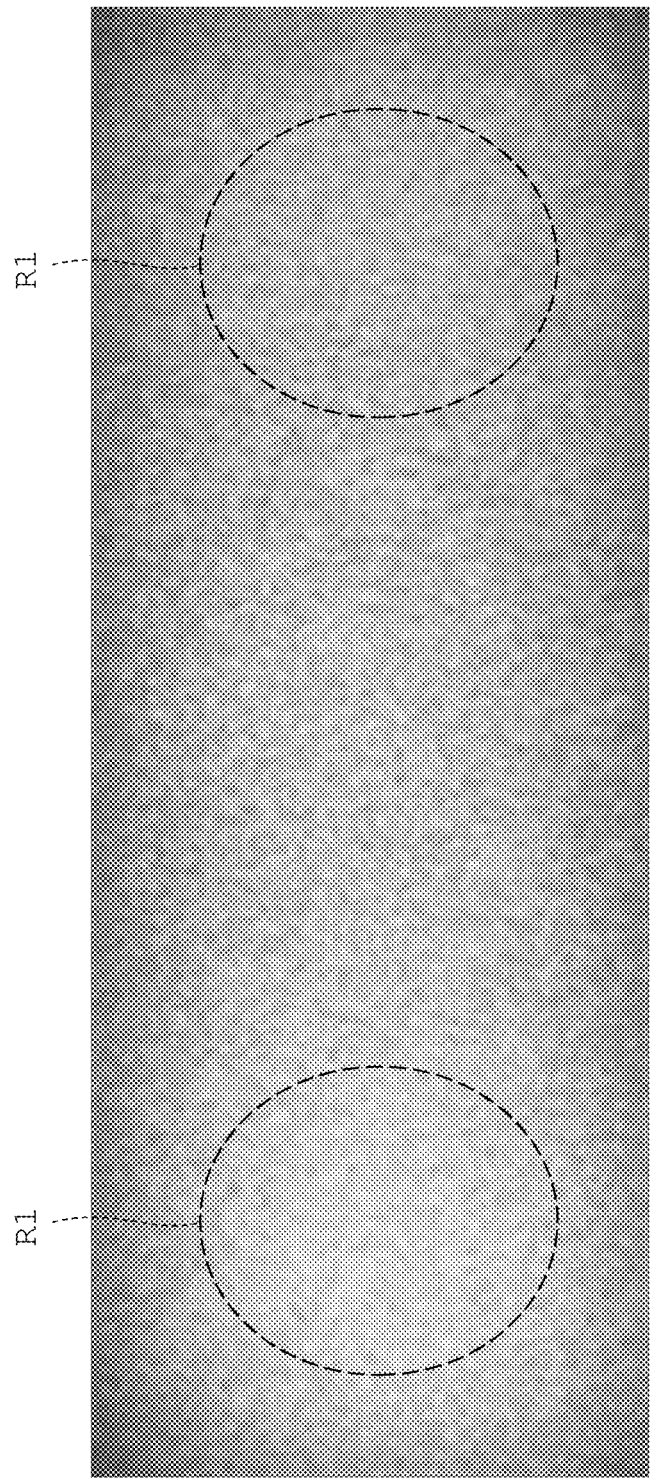
FIG. 4 shows an image obtained by capturing a white projection image according to Comparative Example.

FIG. 4 shows an image captured at an observation plane P2 in FIG. 2 when the light sources 11, 12, 13 are controlled such that a white image is displayed, in the configuration of Comparative Example. For convenience, in FIG. 4, the color image is converted to gray scale to be shown.

Here, the optical elements (the fly-eye lens 22, the cylindrical lens array 24, the diffusion plate 25, and the field lens 26) of a single system for suppressing color unevenness are made almost sufficiently appropriate with respect to the laser lights (beam profiles) in the green and blue wavelength bands. Therefore, the green and blue laser lights are substantially uniformized by these optical elements, and the white image in FIG. 4 has almost no color unevenness with respect to green and blue.

However, as for the laser light in the red wavelength band emitted from the light source 11, as shown in FIG. 3A, the beam profile is significantly different from those of the green and blue laser lights. Therefore, the optical elements of the above single system cannot be sufficiently made appropriate with respect to the laser light in the red wavelength band, as well as the laser lights in the green and blue wavelength bands. Therefore, in the white image in FIG. 4, reddishness is strong in two regions R1 indicated by the broken lines.

That is, out of the three peaks shown in FIG. 3A, the center peak is at substantially the same position as the peaks of green and blue. Therefore, at the center position in the white image, color unevenness with respect to red is also suppressed, similarly to green and blue. In contrast, the green and blue laser lights do not have peaks at the positions of the peaks at both ends shown in FIG. 3A. Therefore, in the white image, color unevenness with respect to red remains in the regions R1 corresponding to these peaks on both sides, resulting in strong reddishness.

In the configuration of Comparative Example in FIG. 2, in order to suppress the reddishness in the region R1, it is possible to use, for example, a method of setting the diffusion angle of the diffusion plate 25 to be large, or a method of adjusting the focal lengths of the cylindrical lens array 24 and the field lens 26 such that the illumination light spreads with respect to the display region (modulation region) of the display element 31. However, with these methods, in association with increase in the diffusion angle or expansion in the illumination region, the amount of laser lights that goes outside the display region of the display element 31 increases. Therefore in the laser light of each color, the loss in the amount of laser lights that is not used in the projection image becomes large, and as a result, the utilization efficiency of the laser lights significantly decreases.

In contrast, in the configuration of the embodiment in FIG. 1, in the illumination optical system 20, the optical elements (the fly-eye lens 22a, the cylindrical lens array 24a, the diffusion plate 25a, and the field lens 26a) of the first system through which the laser light in the red wavelength band emitted from the light source 11 passes, and the optical elements (the fly-eye lens 22b, the cylindrical lens array 24b, the diffusion plate 25b, and the field lens 26b) of the second system through which the laser lights in the green and blue wavelength bands emitted from the light sources 12, 13 pass, are different from each other. Therefore, while the optical elements (the fly-eye lens 22b, the cylindrical lens array 24b, the diffusion plate 25b, and the field lens 26b) of the second system are made appropriate with respect to the green and blue laser lights, the optical elements (the fly-eye lens 22a, the cylindrical lens array 24a, the diffusion plate 25a, and the field lens 26a) of the first system can be optimized with respect to the red laser light. Accordingly, while the light amount loss is suppressed, color unevenness can also be appropriately suppressed with respect to any of red, green, and blue laser lights.

For example, so as to eliminate the strong reddishness in the region R1 in FIG. 4, the diffusion angle of the diffusion plate 25a for red is set to be larger than the diffusion angle of the diffusion plate 25b for green and blue. Alternatively, the focal lengths of the cylindrical lens array 24b and the field lens 26b for green and blue are set such that the illumination region of the green and blue laser lights is substantially aligned with the display region of the display element 31b, and the focal lengths of the cylindrical lens array 24a and the field lens 26a for red are set such that the illumination region of the red laser light spreads wider than the display region of the display element 31a.

Other than this, the shapes of the cylindrical lenses L1, L2 of the cylindrical lens array 24a for red may be adjusted to shapes that allow the beam profile of the laser light in the red wavelength band to be uniformized on the display region of the display element 31a. In this case, the cylindrical lenses L1, L2 of the cylindrical lens array 24a may be set to have aspherical shapes.

Through these adjustments, increase in reddishness in the region R1 (see FIG. 4) in the projection image can be suppressed, and color unevenness with respect to any color can also be effectively suppressed.

In a case where the optical elements of the first system are adjusted as described above, although loss in the amount of the laser light in the red wavelength band emitted from the light source 11 is caused, losses in the amounts of the laser lights in the green and blue wavelength bands emitted from the light sources 12, 13 are suppressed. Meanwhile, as described above, the light source 11 is set in advance so as to have a high maximum emission power by having three light emitting parts. Therefore, even when a little loss is caused in the amount of the laser light in the red wavelength band, laser light in a sufficient light amount necessary for image display can be guided to the display element 31a.

In the configuration in FIG. 1, the laser lights in the green and blue wavelength bands are guided to the single display element 31b, and thus, emission and modulation of the green and blue laser lights are performed in a manner of time division. In this case, as described below, it is preferable that the duty of the time division above is set in accordance with the maximum emission powers of the light sources 12, 13.

Figure 5:
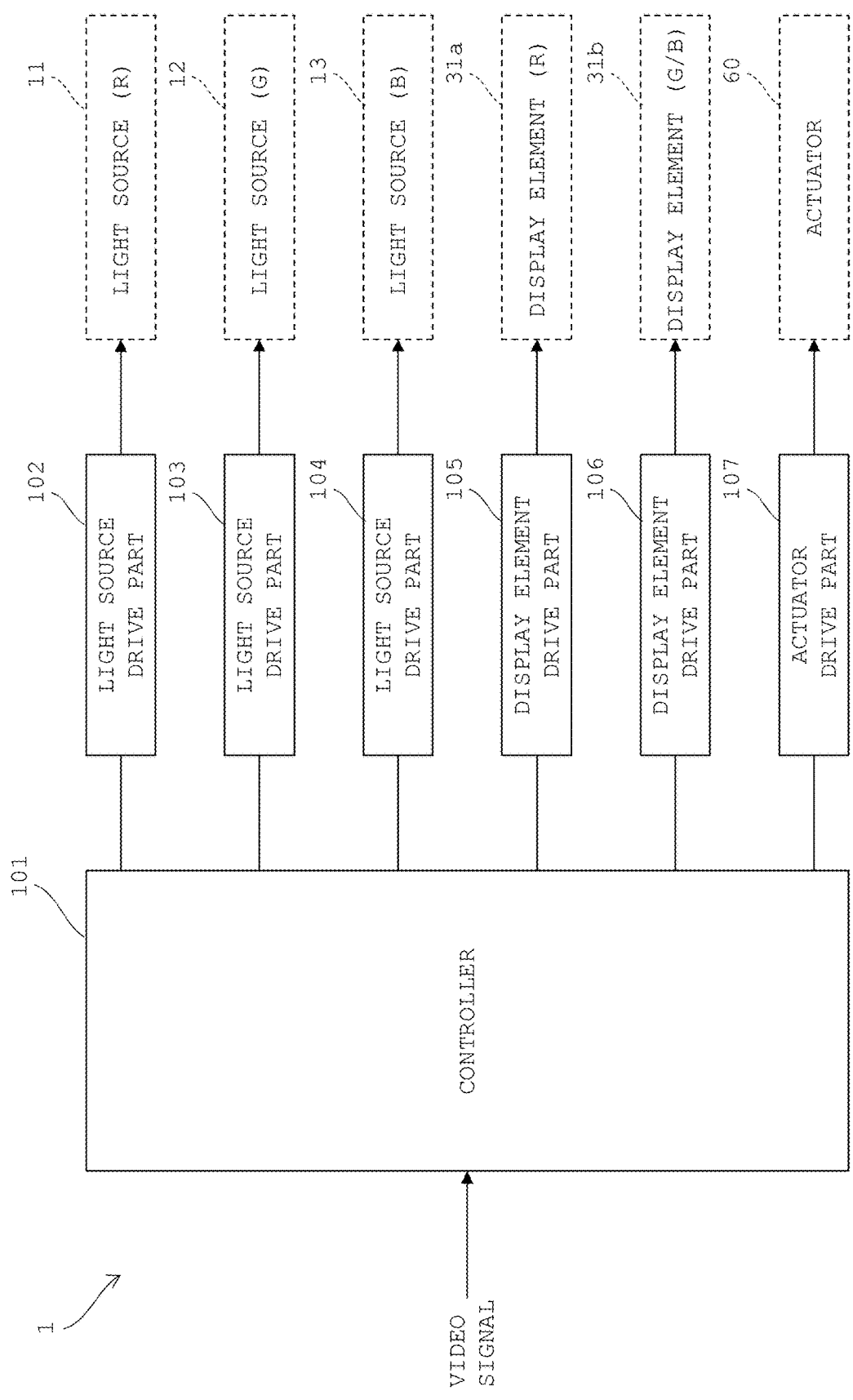
FIG. 5 is a block diagram showing a configuration of a circuitry of the image projection apparatus according to the embodiment.

FIG. 5 is a block diagram showing a configuration of a circuitry of the image projection apparatus 1 according to the embodiment.

The image projection apparatus 1 includes, as components of the circuitry: a controller 101; light source drive parts 102 to 104; display element drive parts 105, 106; and an actuator drive part 107.

The controller 101 includes an arithmetic processing circuit such as a CPU, and a memory, and controls each component according to a program stored in the memory. The light source drive parts 102 to 104 respectively drive the light sources 11 to 13 under control from the controller 101. The display element drive parts 105, 106 respectively drive the display elements 31a, 31b under control from the controller 101. The actuator drive part 107 drives the actuator 60 under control from the controller 101.

During image projection, the controller 101 controls the light source drive part 102 to drive the light source 11 in a steady manner, and controls the display element drive part 105 to drive the display element 31a in a steady manner. On the basis of the video signal to be displayed, the controller 101 drives the display element 31a such that a modulation pattern corresponding to a red image for one frame is generated.

During image projection, the controller 101 controls the light source drive parts 103, 104 to drive the light sources 12, 13 in a manner of time division, and controls the display element drive part 106 to drive the display element 31b in a manner of time division. In each time division period, on the basis of the video signal to be displayed, the controller 101 drives the display element 31b such that a modulation pattern corresponding to a green or blue image for one frame is generated.

Figure 6:
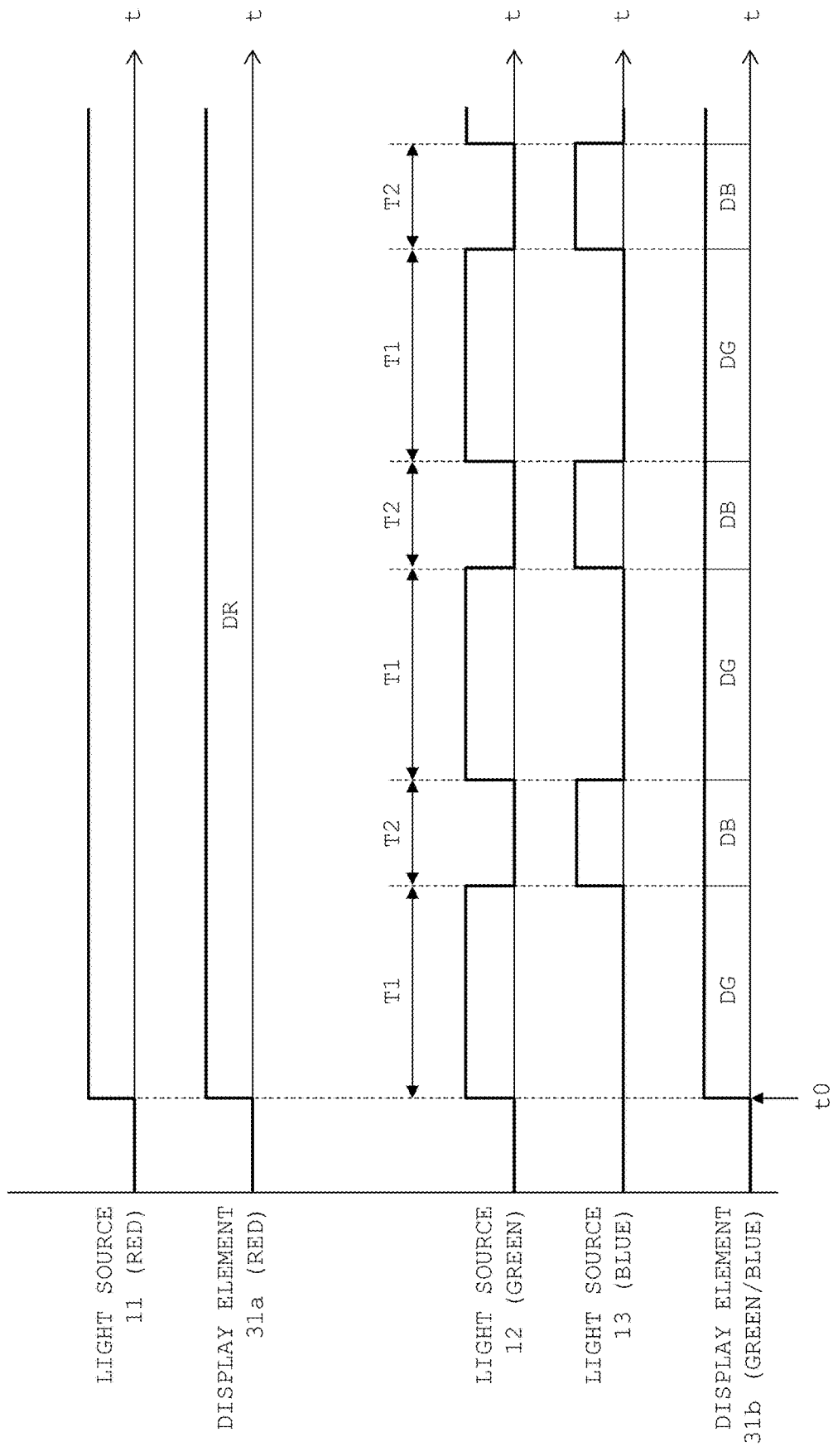
FIG. 6 is a time chart showing control performed on three light sources and two display elements according to the embodiment.

FIG. 6 is a time chart showing control performed on the light sources 11 to 13 and the display elements 31a, 31b.

In FIG. 6, the states where light sources and display elements are driven are indicated by high-level pulse waveforms. DR, DG, DB attached to the waveforms of the respective display elements mean that the display elements are controlled according to the modulation patterns corresponding to red, green, and blue images, respectively.

Upon start of image projection at a time t0, the controller 101 causes the light source 11 to emit light in a steady manner at a constant intensity, and drives the display element 31a in a steady manner in accordance with the video signal. In parallel with this, the controller 101 causes each of the light sources 12, 13 to emit light in a manner of time division at a constant intensity, and drives the display element 31b in a manner of time division in accordance with the video signal. Here, a period T1 for emission and modulation of the green laser light is longer than a period T2 for emission and modulation of the blue laser light. This is because the maximum emission power of the green light source 12 is lower than the maximum emission power of the blue light source 13.

That is, with respect to the light amount proportions of green and blue laser lights necessary for displaying a white image, the light amount proportion of the green laser light is slightly higher than that of the blue laser light. On the other hand, the maximum emission power of the blue light source 13 is higher than the maximum emission power of the green light source 12. For example, the maximum emission power of the blue light source 13 is twice as strong as the maximum emission power of the green light source 12. Therefore, the period T1 is set to be longer than the period T2 so that, in one duty period composed of the periods T1, T2, the green and blue laser lights can be applied in substantially the same light amounts to the display element 31b. For example, the period T1 is set to about twice the period T2.

The frame rates of images for green and blue for the display element 31b are adjusted such that the number of frames of the image for green to be displayed on the display element 31b in the period T1 is the same as the number of frames of the image for blue to be displayed on the display element 31b in the period T2. Further, the frame rate of the image for red for the display element 31b is adjusted such that the number of frames of the image for red to be displayed on the display element 31a in one duty period composed of the periods T1, T2 is the same as the number of frames of the images for green and for blue to be respectively displayed on the display element 31b in the periods T1, T2. The light emission intensities of the light sources 11 to 13 are set such that the proportions of the total amounts of the red, green, and blue laser lights emitted in one duty period are the light amount proportions of these laser lights in a white image.

Through the above control, a natural projection image without any bias among red, green, and blue can be generated.

During image projection, in parallel with this control, the controller 101 controls the actuator drive part 107 to finely vibrate the cylindrical lens arrays 24a, 24b in the Y-axis direction. Accordingly, in any of red, green, and blue images, speckle noise due to interference of the laser lights is suppressed. Therefore, a high-quality projection image can be displayed.

Effects of Embodiment

According to the above embodiment, the following effects are exhibited.

As shown in FIG. 1, the illumination optical system 20 separately includes: the optical elements (the fly-eye lens 22a, the cylindrical lens array 24a, the diffusion plate 25a, and the field lens 26a) of the first system that uniformize the intensity distribution of the laser light in the red wavelength band and guide the resultant laser light to the display element 31a; and the optical elements (the fly-eye lens 22b, the cylindrical lens array 24b, the diffusion plate 25b, and the field lens 26b) of the second system that uniformize the intensity distributions of the laser lights in the green and blue wavelength bands and guide the resultant laser lights to the display element 31b. Accordingly, the optical elements of the first system can be optimized with respect to the laser light in the red wavelength band, and the optical elements of the second system can be made appropriate with respect to the laser lights in the green and blue wavelength bands. Therefore, as compared with the case where all of the laser lights are uniformized by the optical elements (the fly-eye lens 22, the cylindrical lens array 24, the diffusion plate 25, and the field lens 26) of a single system as in Comparative Example shown in FIG. 2, while decrease in the utilization efficiency of the laser lights from the light sources 11, 12, 13 is suppressed, all of the laser lights can be uniformized smoothly and appropriately.

As shown in FIG. 1, the illumination optical system 20 includes the diffusion plate 25a (first diffusion plate), as an optical element of the first system that uniformizes the intensity distribution of the laser light in the red wavelength band and guides the resultant laser light to the display element 31a, and includes the diffusion plate 25b (second diffusion plate) as an optical element of the second system that uniformizes the intensity distributions of the laser lights in the green and blue wavelength bands and guides the resultant laser lights to the display element 31b. Therefore, through adjustment of the diffusion angles of these diffusion plates 25a, 25b, the intensity distribution of the laser light in the red wavelength band and the intensity distributions of the laser lights in the green and blue wavelength bands can be smoothly uniformized, respectively.

As shown in FIG. 1, the illumination optical system 20 includes the cylindrical lens array 24a (first lens array) as an optical element of the first system, and includes the cylindrical lens array 24b (second lens array) as an optical element of the second system. Therefore, through adjustment of the focal lengths, lens shapes, and the like of these cylindrical lens arrays 24a, 24b, the intensity distribution of the laser light in the red wavelength band and the intensity distributions of the laser lights in the green and blue wavelength bands can be smoothly uniformized, respectively.

As shown in FIG. 1, the image projection apparatus 1 includes the actuator 60 that vibrates the supporter 61, and the cylindrical lens arrays 24a, 24b (optical elements, corresponding to each other, of the first system and the second system) are supported by the supporter 61. Therefore, the cylindrical lens arrays 24a, 24b can be simultaneously vibrated by the single actuator 60, and simplification of the configuration and reduction of the cost can be realized.

As shown in FIG. 1, the image projection apparatus 1 includes: the display element 31a (first display element) to which the laser light in the red wavelength band is guided; and the display element 31b (second display element) to which the laser lights in the green and blue wavelength bands are guided. Therefore, as compared with the case where emission and modulation with respect to the laser lights of all the colors are executed in a manner of time division as in Comparative Example shown in FIG. 2, the period for emission and modulation of the laser light of each color can be made longer. Therefore, the light amount of the projection image can be smoothly increased through simpler control.

As shown in FIG. 1, the laser lights (a plurality of other laser lights) in the green and blue wavelength bands are guided to the display element 31b (second display element). As described with reference to FIG. 6, the controller 101 performs, in a manner of time division, emission and modulation of the laser lights (the plurality of other laser lights) in the green and blue wavelength bands, and sets the duty (the periods T1, T2) of the time division in accordance with the maximum emission powers of the light sources 12, 13 which respectively emit the laser lights (the plurality of other laser lights) in the green and blue wavelength bands. Accordingly, in one duty period, the green and blue laser lights can be applied in substantially the same light amounts to the display element 31b. Therefore, a natural-color projection image without bias in green or blue can be generated.

As shown in FIG. 1, the image projection apparatus 1 includes three light sources 11, 12, 13 which respectively emit the laser lights in the red, green, and blue wavelength bands. The optical elements (the fly-eye lens 22a, the cylindrical lens array 24a, the diffusion plate 25a, and the field lens 26a) of the first system for uniformizing the intensity distribution are applied to the laser light in the red wavelength band emitted from the light source 11. Therefore, the laser light in the red wavelength band having a specific beam profile as shown in FIG. 3A can be appropriately uniformized. In addition, the laser lights in the green and blue wavelength bands having beam profiles similar to each other as shown in FIGS. 3B, 3C can be appropriately uniformized with the power loss suppressed, by the optical elements (the fly-eye lens 22b, the cylindrical lens array 24b, the diffusion plate 25b, and the field lens 26b) of the second system. Therefore, while decrease in the utilization efficiency of the laser lights is suppressed, color unevenness in the projection image can be suppressed smoothly and appropriately.

Modification 1

In the above embodiment, the display elements 31a, 31b are implemented by liquid crystal panels of a reflection-type. However, in Modification 1, a liquid crystal panel of a transmission-type is used as a display element.

Figure 7:
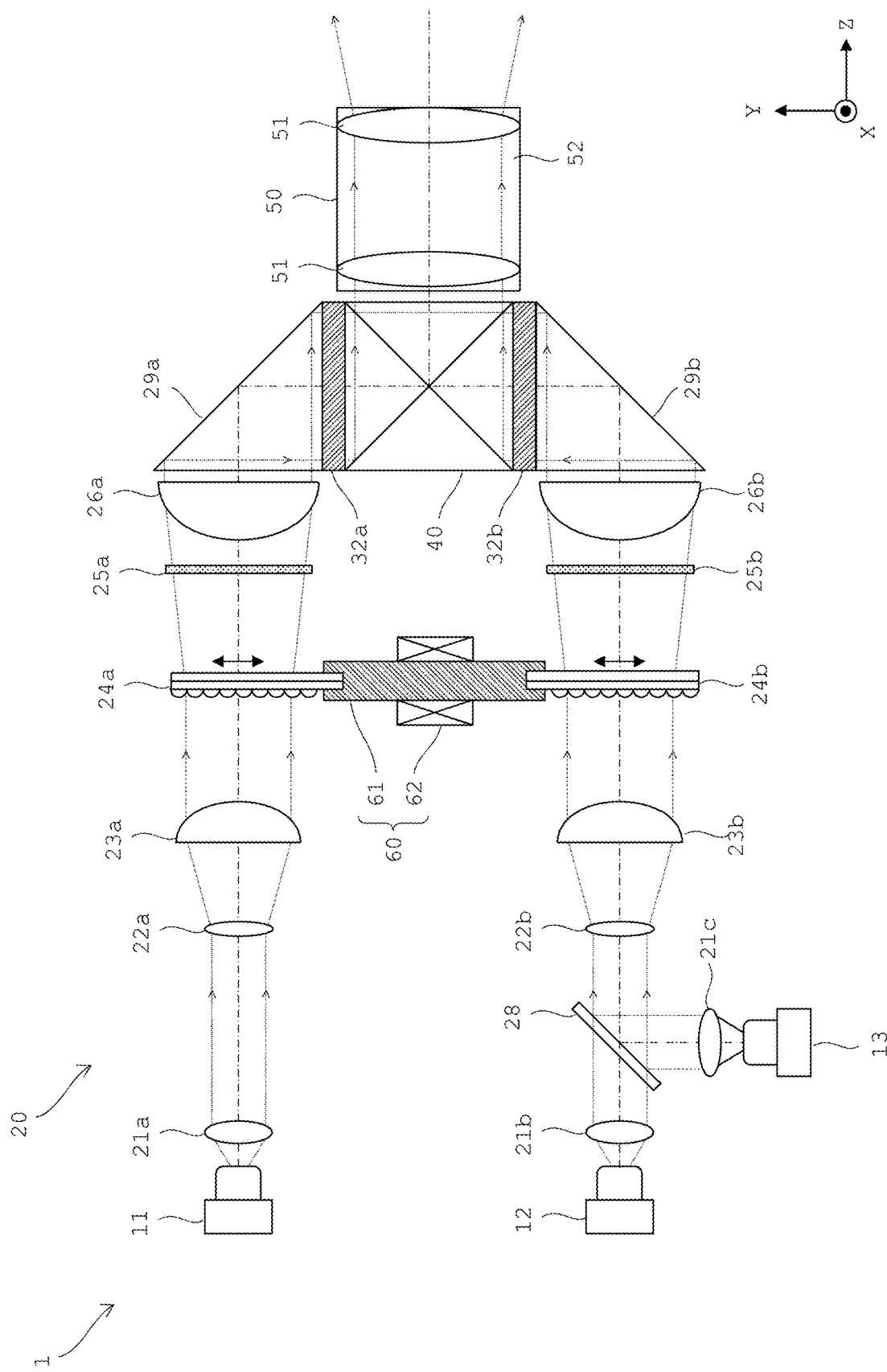
FIG. 7 is a plan view showing a configuration of an optical system of an image projection apparatus according to Modification 1.

FIG. 7 is a plan view showing a configuration of the optical system the image projection apparatus 1 according to Modification 1.

In the configuration in FIG. 7, from the configuration in FIG. 1, the polarizing beam splitters 27a, 27b and the display elements 31a, 31b are replaced with mirrors 29a, 29b and display elements 32a, 32b. The other configurations in FIG. 7 are the same as those in FIG. 1.

As described above, the display elements 32a, 32b are each a liquid crystal panel of a transmission-type. The display elements 32a, 32b each include a polarizer on each of the incident side and the emission side. The light sources 11, 12, 13 are disposed such that the polarization directions of the laser lights that are emitted are aligned with the polarization directions of the polarizers on the incident sides of the display elements 32a, 32b. The mirrors 29a, 29b reflect the laser lights having passed through the field lenses 26a, 26b, toward the display elements 32a, 32b, respectively.

In the configuration of Modification 1 as well, the illumination optical system 20 separately includes: the optical elements (the fly-eye lens 22a, the cylindrical lens array 24a, the diffusion plate 25a, and the field lens 26a) of the first system that uniformize the intensity distribution of the laser light in the red wavelength band and guide the resultant laser light to the display element 32a; and the optical elements (the fly-eye lens 22b, the cylindrical lens array 24b, the diffusion plate 25b, and the field lens 26b) of the second system that uniformize the intensity distributions of the laser lights in the green and blue wavelength bands and guide the resultant laser lights to the display element 32b. Accordingly, the optical elements of the first system can be optimized with respect to the laser light in the red wavelength band, and the optical elements of the second system can be made appropriate with respect to the laser lights in the green and blue wavelength bands. Therefore, as compared with the case where all of the laser lights are uniformized by the optical elements (the fly-eye lens 22, the cylindrical lens array 24, the diffusion plate 25, and the field lens 26) of a single system as in Comparative Example shown in FIG. 2, while decrease in the utilization efficiency of the laser lights from the light sources 11, 12, 13 is suppressed, all of the laser lights can be uniformized smoothly and appropriately on the display elements 32a, 32b.

Modification 2

In the above embodiment, in the illumination optical system 20, the system for the laser light in the red wavelength band and the system for the laser lights in the green and blue wavelength bands are completely separated, and the display elements 31a, 32b are provided for the respective systems. In contrast, in Modification 2, the system for the red laser light is separated, only at the cylindrical lens array 24a and the diffusion plate 25a, from the system for the green and blue laser lights, and the laser lights of all the colors are guided to a single display element.

Figure 8:
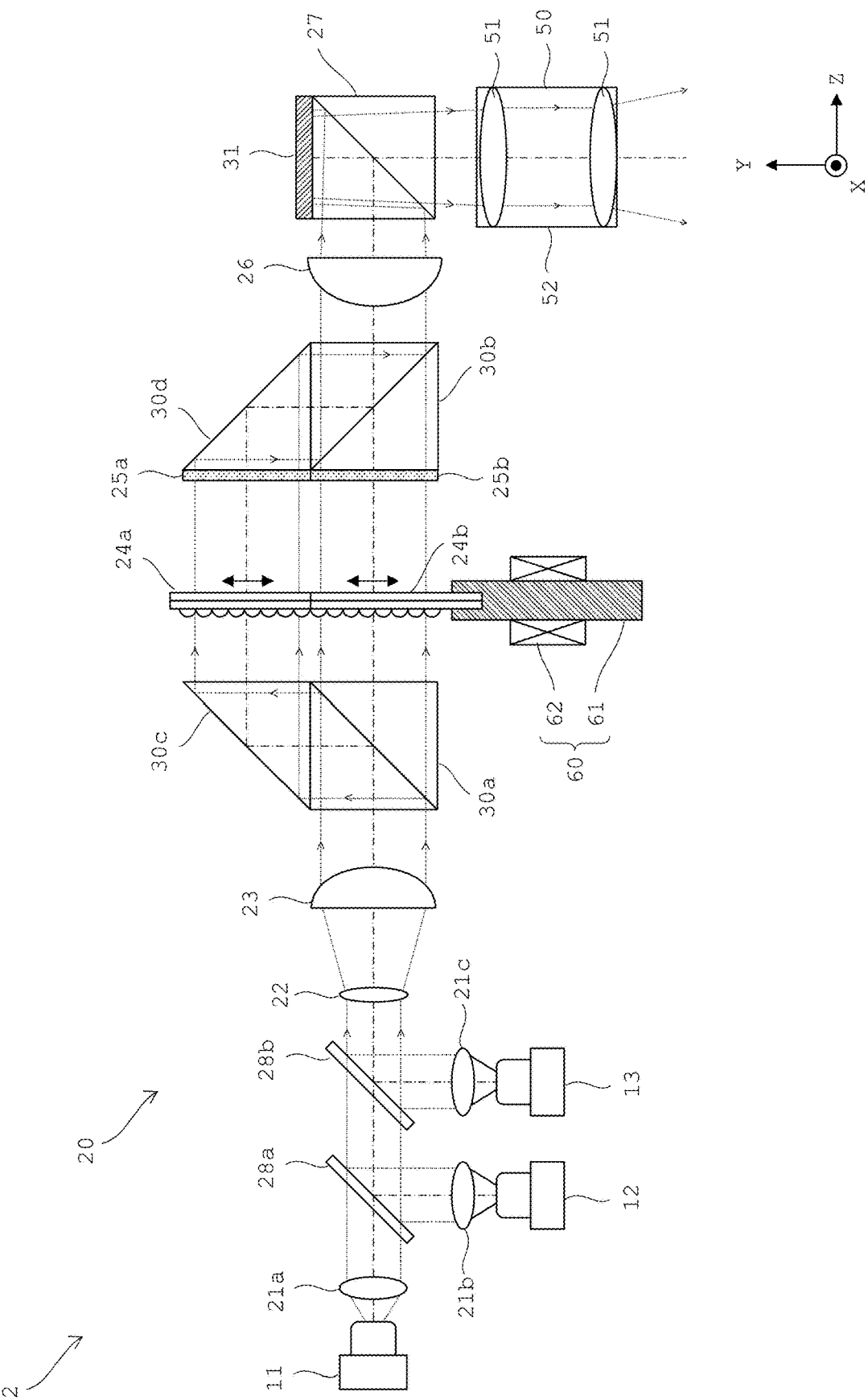
FIG. 8 is a plan view showing a configuration of an optical system of an image projection apparatus according to Modification 2.

FIG. 8 is a plan view showing a configuration of the optical system of the image projection apparatus 1 according to Modification 2.

In the configuration in FIG. 8, dichroic mirrors 30a, 30b and mirrors 30c, 30d are added to the configuration in FIG. 2. The configurations and actions of the light sources 11, 12, 13 to the collimator lens 23 and the configurations and actions of the field lens 26 to the projection lenses 51 are the same as those in FIG. 2.

The dichroic mirrors 30a, 30b reflect the light in the red wavelength band, and allow the lights in the green and blue wavelength bands to pass therethrough. Therefore, out of the laser lights in the red, green, and blue wavelength bands having passed through the collimator lens 23, only the laser light in the red wavelength band is reflected in the Y-axis positive direction by the dichroic mirror 30a. Then, the laser light in the red wavelength band is reflected in the Z-axis positive direction and the Y-axis negative direction respectively by the mirrors 30c, 30d, to be incident on the dichroic mirror 30b. Further, the laser light in the red wavelength band is reflected in the Z-axis positive direction by the dichroic mirror 30b, to be incident on the field lens 26. The laser lights in the green and blue wavelength bands having passed through the collimator lens 23 pass through the two dichroic mirrors 30a, 30b, to be incident on the field lens 26.

The cylindrical lens array 24a and the diffusion plate 25a similar to those in FIG. 1 are disposed between the mirrors 30c, 30d. The cylindrical lens array 24b and the diffusion plate 25b similar to those in FIG. 1 are disposed between the dichroic mirrors 30a, 30b. The cylindrical lens arrays 24a, 24b are integrated and supported by the supporter 61 of the actuator 60.

In the configuration in FIG. 8, the illumination optical system 20 separately includes: the optical elements (the cylindrical lens array 24a and the diffusion plate 25a) of the first system that uniformize the intensity distribution of the laser light in the red wavelength band and guide the resultant laser light to the display element 31; and the optical elements (the cylindrical lens array 24b and the diffusion plate 25b) of the second system that uniformize the intensity distributions of the laser lights in the green and blue wavelength bands and guide the resultant laser lights to the display element 32b. Accordingly, the optical elements (the cylindrical lens array 24a and the diffusion plate 25a) of the first system can be optimized with respect to the laser light in the red wavelength band, and the optical elements (the cylindrical lens array 24b and the diffusion plate 25b) of the second system can be made appropriate with respect to the laser lights in the green and blue wavelength bands. Therefore, as compared with the case where all of the laser lights are uniformized by the optical elements (the fly-eye lens 22, the cylindrical lens array 24, the diffusion plate 25, and the field lens 26) of a single system as in Comparative Example shown in FIG. 2, while decrease in the utilization efficiency of the laser lights emitted from the light sources 11, 12, 13 is suppressed, all of the laser lights can be uniformized smoothly and appropriately on the display elements 32a, 32b. Accordingly, color unevenness in the projection image can be appropriately suppressed.

In the configuration in FIG. 8, the system for the red laser light is separated, only at the cylindrical lens array 24a and the diffusion plate 25a, from the system for the green and blue laser lights, and the other portions of the optical system are used in common for the laser lights of all the colors. Therefore, the configuration of the entire optical system can be simplified, and reduction of the number of components and the cost can be realized. Since only one display element 31 is disposed, simplification of the configuration and reduction of the cost of the image projection apparatus 1 can be realized.

However, in the configuration in FIG. 8, since the laser lights of all the colors are applied to the single display element 31, emission and modulation need to be executed in a manner of time division with respect to the laser lights of all the colors. In this case as well, the controller 101 may set the period (duty) for emission and modulation of the light of each color such that the light amount proportion of each light is appropriate during display of a white image.

Other than this, in the configuration in FIG. 8 as well, two cylindrical lens arrays 24a, 24b can be simultaneously driven by the single actuator 60 as in the above embodiment. Therefore, simplification of the configuration and reduction of the cost of the image projection apparatus 1 can be realized.

Modification 3

In Modification 3, the system for the red laser light in the illumination optical system 20 is separated, only at the diffusion plate 25a, from the system for the green and blue laser lights, and the laser lights of all the colors are guided to a single display element.

Figure 9:
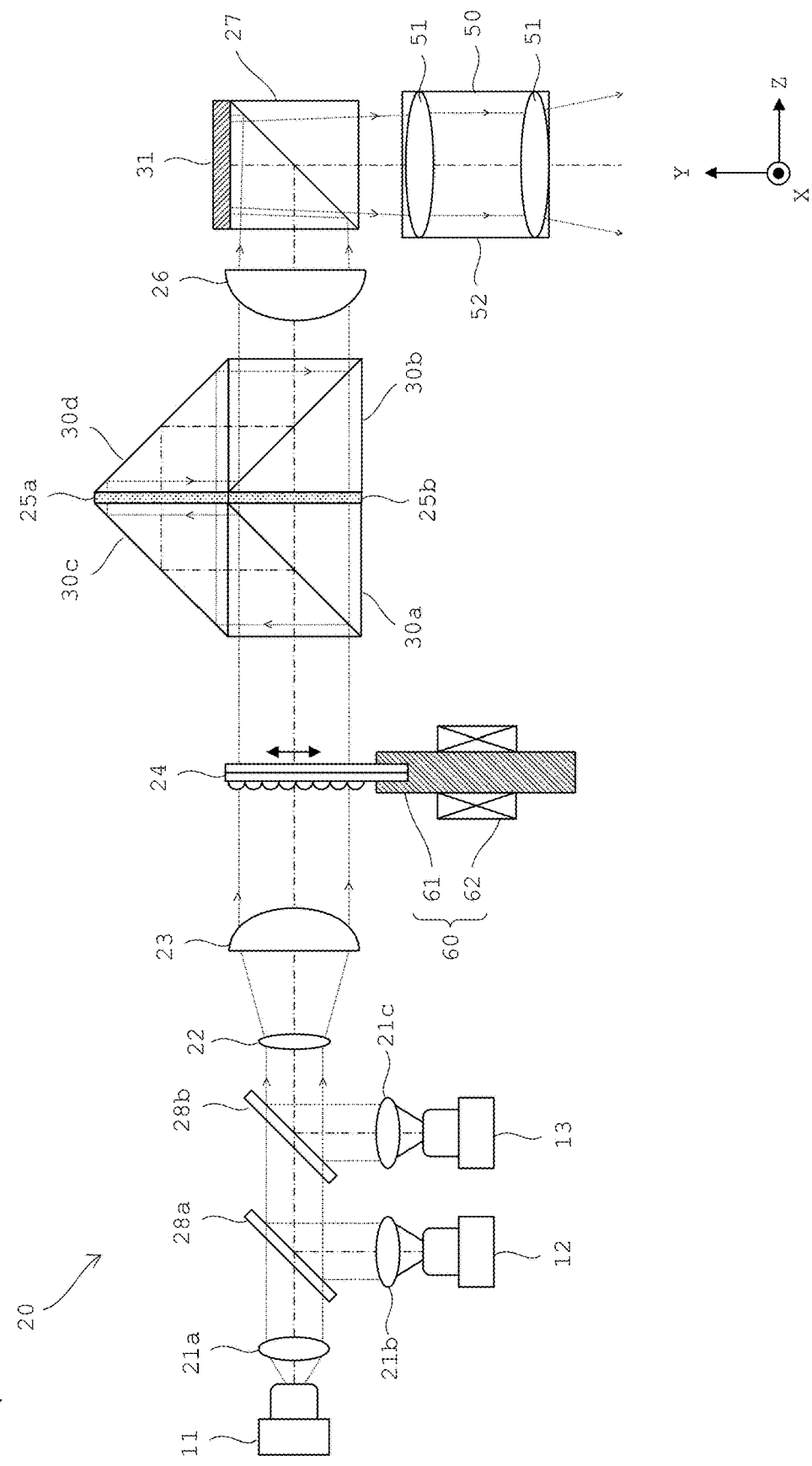
FIG. 9 is a plan view showing a configuration of an optical system of an image projection apparatus according to Modification 3.

FIG. 9 is a plan view showing a configuration of the optical system of the image projection apparatus 1 according to Modification 3.

In the configuration in FIG. 9, as compared with the configuration in FIG. 8, the disposition of the cylindrical lens array 24 is different. That is, only the diffusion plates 25a, 25b are disposed between the mirrors 30c, 30d and between the dichroic mirrors 30a, 30b, respectively, and the common cylindrical lens array 24 is disposed between the collimator lens 23 and the dichroic mirror 30a. The configurations and actions of the optical system other than the dichroic mirrors 30a, 30b, the mirrors 30c, 30d, and the diffusion plates 25a, 25b are the same as those of Comparative Example in FIG. 2. The configurations and actions of the diffusion plates 25a, 25b are the same as those in the embodiment in FIG. 1.

In the configuration in FIG. 9, the illumination optical system 20 separately includes: the optical element (the diffusion plate 25a) of the first system that uniformizes the intensity distribution of the laser light in the red wavelength band and guides the resultant laser light to the display element 31; and the optical element (the diffusion plate 25b) of the second system that uniformizes the intensity distributions of the laser lights in the green and blue wavelength bands and guides the resultant laser lights to the display element 32b. Accordingly, the optical element (the diffusion plate 25a) of the first system can be optimized with respect to the laser light in the red wavelength band, and the optical element (the diffusion plate 25b) of the second system can be made appropriate with respect to the laser lights in the green and blue wavelength bands. Therefore, as compared with the case where all of the laser lights are uniformized by the optical elements (the fly-eye lens 22, the cylindrical lens array 24, the diffusion plate 25, and the field lens 26) of a single system as in Comparative Example shown in FIG. 2, while decrease in the utilization efficiency of the laser lights from the light sources 11, 12, 13 is suppressed, all of the laser lights can be uniformized smoothly and appropriately on the display elements 32a, 32b. Accordingly, color unevenness in the projection image can be appropriately suppressed.

In the configuration in FIG. 9, the system for the red laser light is separated, only at the diffusion plate 25a, from the system for the green and blue laser lights, and the other portions of the optical system are used in common for the laser lights of all the colors. Therefore, as compared with the configuration in FIG. 8, the configuration of the entire optical system can be further simplified.

In the configuration in FIG. 9 as well, as in the configuration in FIG. 8, since the laser lights of all the colors are applied to the single display element 31, emission and modulation need to be executed in a manner of time division with respect to the laser lights of all the colors. In this case as well, the controller 101 may set the period (duty) for emission and modulation of the light of each color such that the light amount proportion of each light is appropriate during display of a white image.

Modification 4

In the configuration of Modification 2, the cylindrical lens array 24b and the diffusion plate 25b are used in common for the green and blue laser lights. In contrast, in Modification 4, a cylindrical lens array and a diffusion plate are separately disposed for each of the laser lights in the red, green, and blue wavelength bands.

Figure 10:
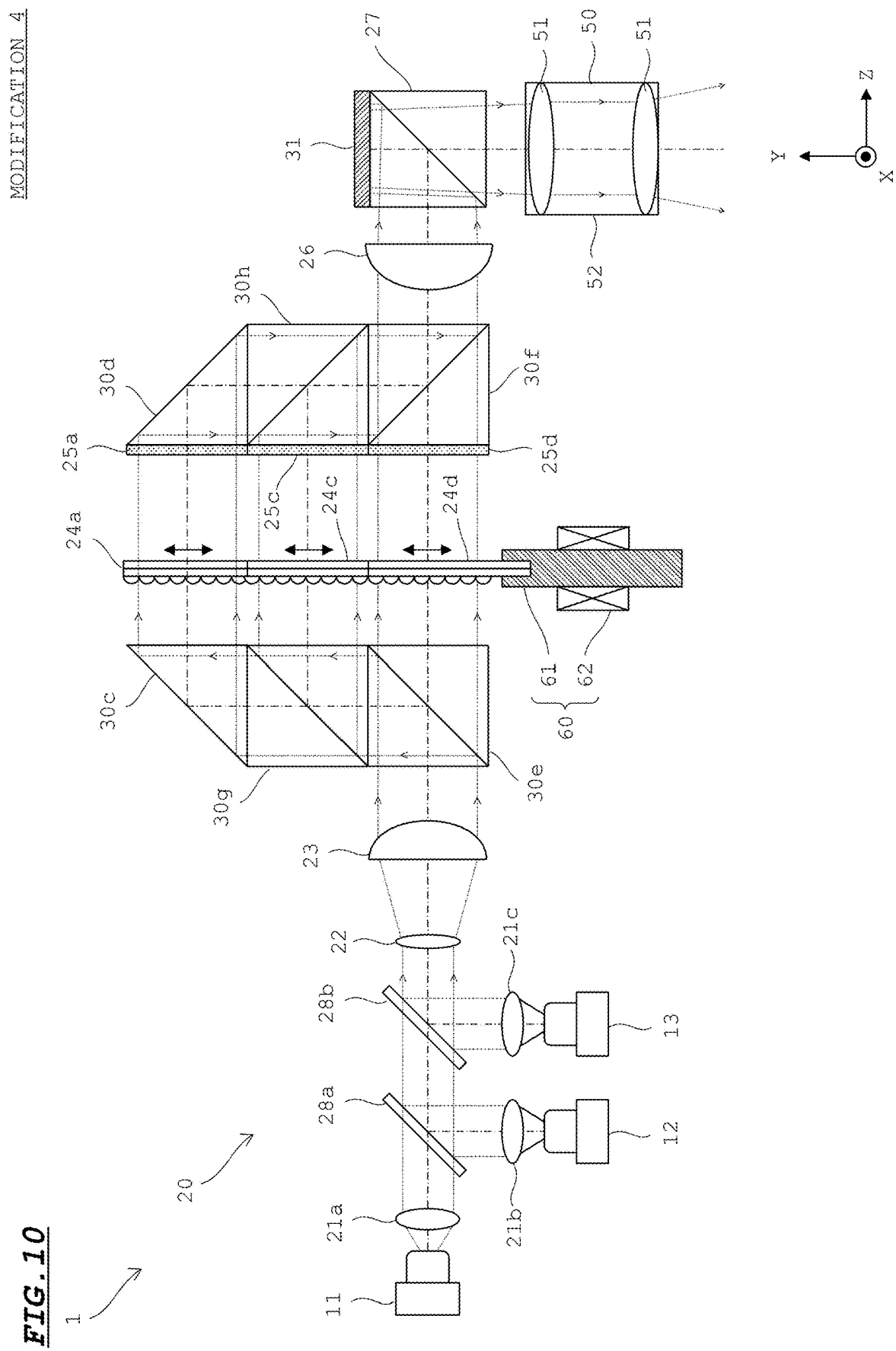
FIG. 10 is a plan view showing a configuration of an optical system of an image projection apparatus according to Modification 4.

FIG. 10 is a plan view showing a configuration of the optical system of the image projection apparatus 1 according to Modification 4.

In the configuration in FIG. 10, the dichroic mirrors 30a, 30b and the mirrors 30c, 30d in the configuration in FIG. 8 are replaced with dichroic mirror 30e to 30h and the mirrors 30c, 30d.

The dichroic mirrors 30e, 30f reflect the lights in the red and green wavelength bands and allow the light in the blue wavelength band to pass therethrough. The dichroic mirrors 30g, 30h allow the light in the red wavelength band to pass therethrough and reflect the light in the blue wavelength band.

Therefore, the laser light in the red wavelength band having passed through the collimator lens 23 advances in the order of the dichroic mirror 30e, the dichroic mirror 30g, the mirrors 30c, 30d, the dichroic mirror 30h, and the dichroic mirror 30f, and is reflected in the Z-axis positive direction by the dichroic mirror 30f, to be incident on the field lens 26. The laser light in the green wavelength band having passed through the collimator lens 23 advances in the order of the dichroic mirror 30e, the dichroic mirror 30g, the dichroic mirror 30h, and the dichroic mirror 30f, and is reflected in the Z-axis positive direction by the dichroic mirror 30f, to be incident on the field lens 26. The laser light in the blue wavelength band having passed through the collimator lens 23 passes through the dichroic mirrors 30e, 30f in the Z-axis positive direction, to be incident on the field lens 26.

The cylindrical lens array 24a and the diffusion plate 25a for uniformizing the laser light in the red wavelength band on the display element 31 are disposed between the mirrors 30c, 30d. A cylindrical lens array 24c and a diffusion plate 25c for uniformizing the laser light in the green wavelength band on the display element 31 are disposed between the dichroic mirrors 30g, 30h. A cylindrical lens array 24d and a diffusion plate 25d for uniformizing the laser light in the blue wavelength band on the display element 31 are disposed between the dichroic mirrors 30e, 30f.

The cylindrical lens arrays 24a, 24c, 24d are integrated and supported by the supporter 61 of the actuator 60.

In the configuration in FIG. 10, the cylindrical lens arrays 24a, 24c, 24d and the diffusion plates 25a, 25c, 25d are separately disposed with respect to the laser lights in the red, green, and blue wavelength bands. Therefore, with respect to the laser light in the wavelength band of each color, the optical elements (the cylindrical lens array 24a and the diffusion plate 25a) of the first system can be optimized, and further, with respect to the laser lights in the green and blue wavelength bands, the optical elements (the cylindrical lens arrays 24c, 24d and the diffusion plates 25c, 25d) of two second systems can each be optimized. Therefore, while decrease in the utilization efficiency of the laser lights from the light sources 11, 12, 13 is suppressed, all of the laser lights can be uniformized further smoothly and appropriately on the display element 31, and color unevenness in the projection image can be more appropriately suppressed.

In the configuration in FIG. 10 as well, three cylindrical lens arrays 24a, 24c, 24d can be simultaneously driven by the single actuator 60. Therefore, simplification of the configuration and reduction of the cost can be realized.

In the configuration in FIG. 10 as well, as in FIG. 9, the cylindrical lens array 24 may be disposed between the collimator lens 23 and the dichroic mirror 30e, and only the diffusion plates 25a, 25c, 25d may be disposed between the mirrors 30c, 30d, between the dichroic mirrors 30g, 30h, and between the dichroic mirrors 30e, 30f, respectively. Accordingly, the configuration of the optical system can be further simplified.

In the configuration in FIG. 10, the cylindrical lens array and the diffusion plate through which laser light of one of the colors passes correspond to the optical elements of the first system, and the cylindrical lens arrays and the diffusion plates through which the laser lights of the other colors respectively pass correspond to the optical elements of the second system.

Modification 5

In the above embodiment, in order to suppress speckle noise in the projection image, the cylindrical lens arrays 24a, 24b are vibrated by the actuator 60. However, speckle noise in the projection image may be suppressed by vibrating another optical element.

Figure 11:
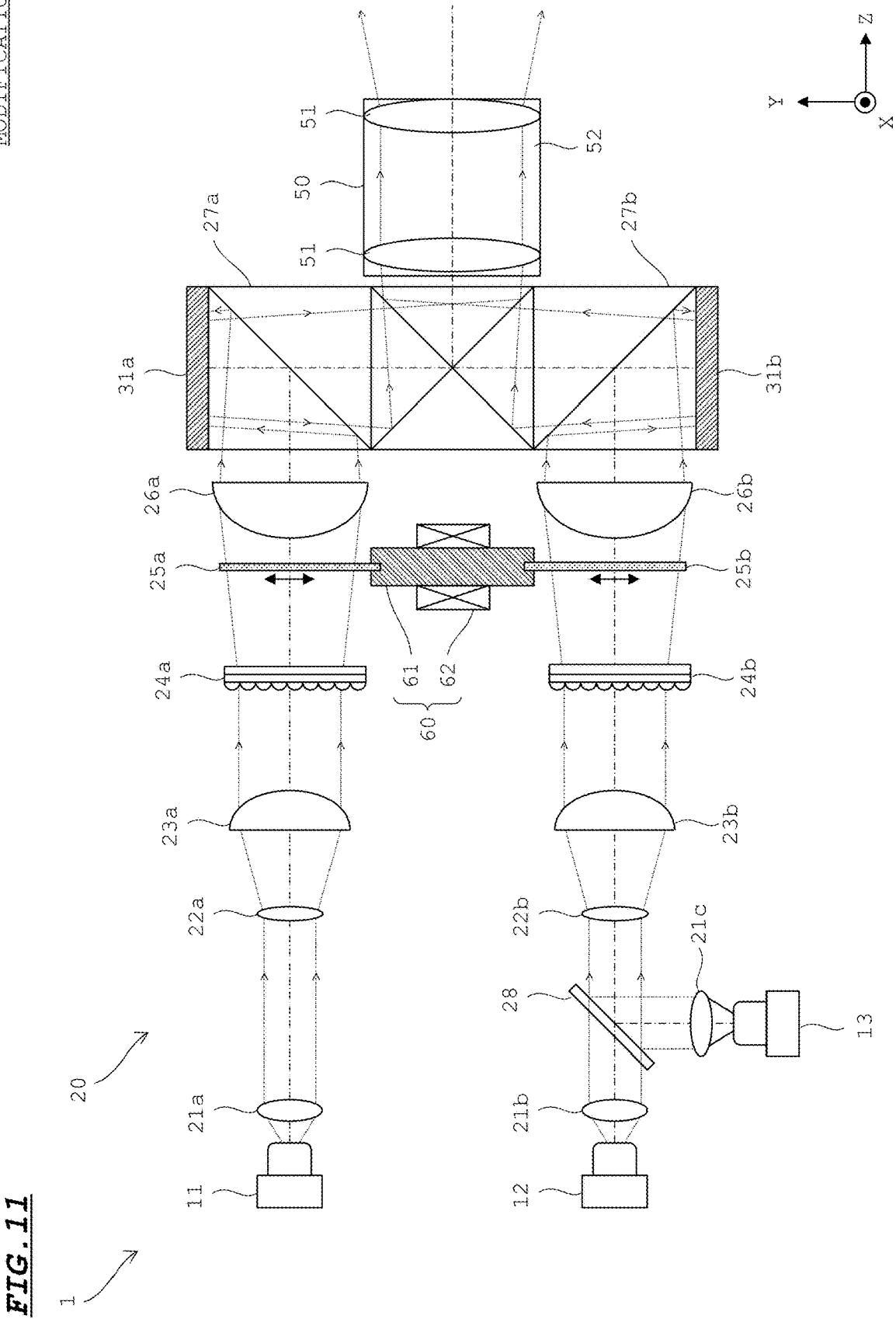
FIG. 11 is a plan view showing a configuration of an optical system of an image projection apparatus according to Modification 5.
Figure 12:
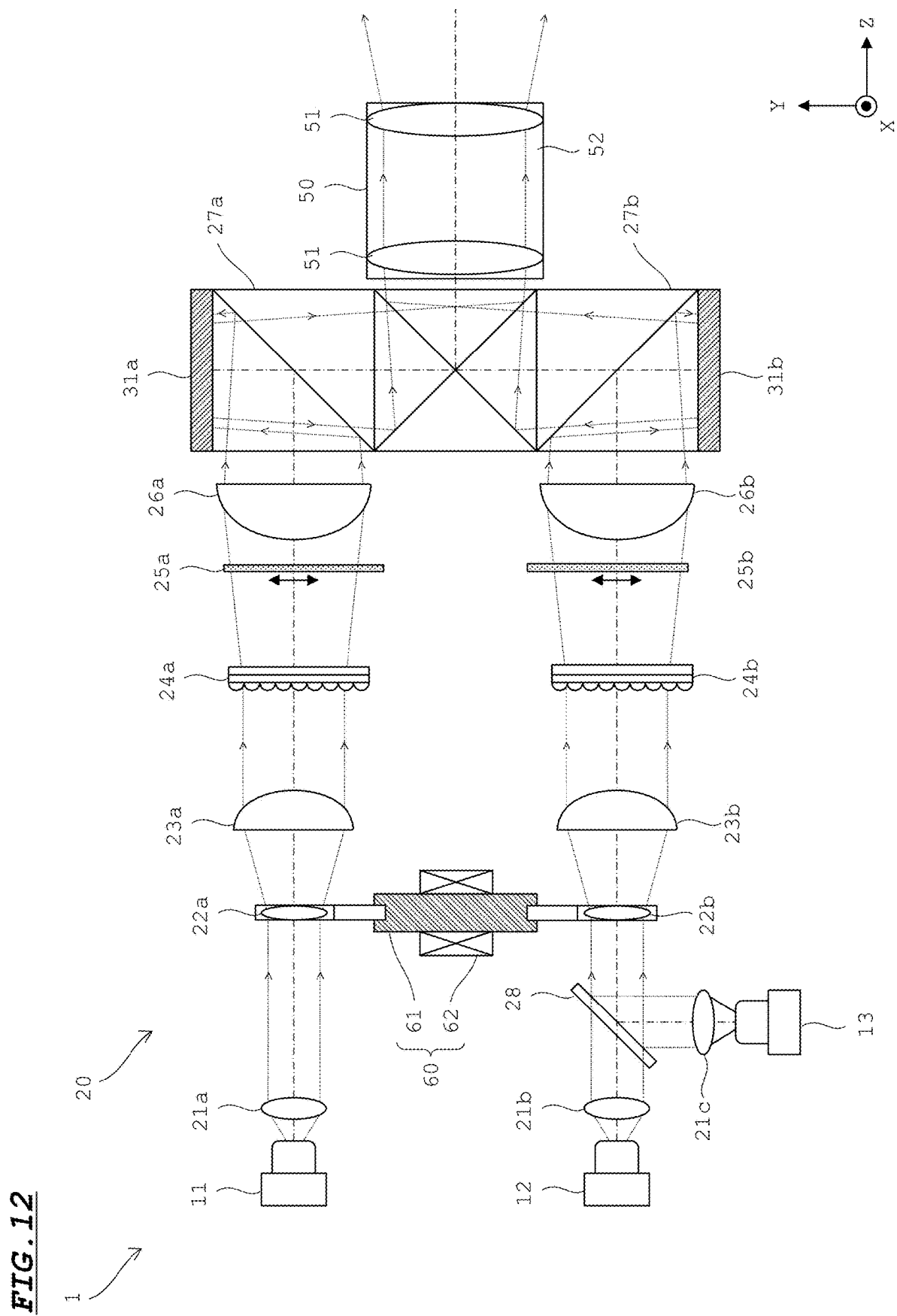
FIG. 12 is a plan view showing another configuration of the optical system of the image projection apparatus according to Modification 5.

For example, as shown in FIG. 11, the diffusion plates 25a, 25b may be supported by the supporter 61 of the actuator 60. Alternatively, as shown in FIG. 12, the fly-eye lenses 22a, 22b may be supported by the supporter 61 of the actuator 60. With these configurations as well, the diffusion plates 25a, 25b (optical elements, corresponding to each other, of the first system and the second system) or the fly-eye lenses 22a, 22b (optical elements, corresponding to each other, of the first system and the second system) can be simultaneously driven by the single actuator 60. Therefore, simplification of the configuration and reduction of the cost of the image projection apparatus 1 can be realized.

Other Modifications

In the above embodiment and Modifications 1 to 5, as the lens array for defining the illumination region of the illumination light in the display element, the cylindrical lens arrays 24a to 24d having the cylindrical lenses L1, L2 on each of the incident surface and the emission surface are used. However, the lens array is not limited thereto, and for example, a lens array formed such that a large number of lenses each curved in the X-axis direction and the Y-axis direction are arranged in the X-axis direction and the Y-axis direction on one of the incident surface and the emission surface, may be used. In this case, each lens is adjusted such that the convergence action in the Y-axis direction is greater than the convergence action in the X-axis direction, similar to the lens parts of the cylindrical lens arrays 24a, 24b in the configuration in FIG. 1. Each lens defines, together with the action by a fly-eye lens in the subsequent stage, the illumination region of the laser light of each color in the display element.

In the above embodiment and Modifications 1 to 3, to the laser light in the red wavelength band, the optical elements (the cylindrical lens array 24a, the diffusion plate 25a, etc.) of the first system that uniformize the intensity distribution of the laser light have been assigned. However, the laser light to which the optical elements of the first system are assigned is not limited thereto. For example, to the laser light in the green wavelength band emitted from the light source 12 whose maximum emission power is low, the optical elements of the first system may be assigned, and to the laser lights in the red and blue wavelength bands, the optical elements of the second system may be assigned.

In this case, as for the optical elements of the second system, in order to uniformize the laser light in the red wavelength band on the display element, for example, the diffusion angle of the diffusion plate is set to be large, or alternatively, the focal lengths of the cylindrical lens array and the field lens are adjusted such that the illumination region becomes larger than the display region of the display element. Therefore, slight power loss is caused in the laser light in the blue wavelength band as well as in the laser light in the red wavelength band.

However, since the optical elements of the first system are assigned to the laser light in the green wavelength band, the optical elements of the first system can be optimized for the laser light in the green wavelength band. Therefore, occurrence of power loss in the laser light in the green wavelength band can be suppressed.

In this configuration, as in FIG. 1, different display elements may be respectively assigned to the laser light in the green wavelength band and the laser lights in the red and blue wavelength bands. Accordingly, the light source 12 in the low-power green wavelength band can be caused to emit light in a steady manner without time division, and the amount of the laser light in the green wavelength band can be maintained at a high level.

Thus, from the viewpoint of the maximum emission power of the light source, the laser light to which the optical elements of the first system are assigned may be selected. In the above embodiment, the beam profile of the laser light in the red wavelength band is a specific beam profile as compared with those of the other laser lights. However, when the beam profile of the laser light in the wavelength band other than red is a specific beam profile, the optical elements of the first system may be assigned to this laser light.

In the above embodiment and Modifications 1 to 5, laser lights in three wavelength bands of red, green, and blue are used. However, the kinds of color of the laser light for generating a projection image are not limited thereto. For example, laser lights in four or more kinds of wavelength bands different from each other may be used in generation of a projection image, or alternatively, laser lights in two kinds of wavelength bands may be used in generation of a projection image. In these cases, the optical elements of the first system may be assigned to the laser light in one of those wavelength bands, or the optical elements of the first system may be assigned to each of the wavelength bands, as in FIG. 10.

The configuration of the optical system of the image projection apparatus 1 is not limited to the configurations shown in the above embodiment and Modifications 1 to 5. For example, in Modifications 2, 3, the optical path of the laser light in the red wavelength band branched from the main optical path passes through optical elements, and is integrated to the main optical path again, and guided to the common field lens. However, the optical system from the cylindrical lens array 24a to the polarizing beam splitter 27a in FIG. 1 may be applied to the branched laser light in the red wavelength band, and the laser light in the red wavelength band may be guided to the display element 31a separately assigned for red. In this case, the optical system from the cylindrical lens array 24b to the polarizing beam splitter 27b in FIG. 1 is applied to the laser lights in the green and blue wavelength bands, and the laser lights in the green and blue wavelength bands are guided to the display element 31b assigned for green and blue. Then, the laser lights of the respective colors modulated by the display elements 31a, 31b are guided to the projection lenses 51 through the combining element 40.

In the above embodiment and Modifications 1 to 5, as the display element for modulating the laser light of each color, a liquid crystal panel of a reflection-type or transmission-type is used. However, the display element used for modulation is not limited thereto. For example, as the display element, a display element based on another method such as a digital mirror device (DMD) may be used. In this case, the configuration of the optical system may be changed according to change of the method adopted in the display element. For example, in the configuration in FIG. 1, when a DMD is used as the display element 31a, 31b, a ¼ wave plate may be disposed between the display elements 31a, 31b and the polarizing beam splitters 27a, 27b.

In addition to the above, various modifications can be made as appropriate to the embodiment of the present invention, without departing from the scope of the technological idea defined by the claims.

What is claimed is:

1. An image projection apparatus comprising:
    at least three light sources configured to respectively emit laser lights of colors different from each other;
    at least one display element configured to modulate each of the laser lights emitted from the at least three light sources, on the basis of a video signal;
    an illumination optical system configured to guide the laser lights emitted from the at least three light sources, to the display element; and
    a projection lens configured to project the laser lights modulated by the display element, wherein
    the illumination optical system separately includes
        an optical element of a first system configured to uniformize an intensity distribution of one of the laser lights emitted from one of the at least three light sources and guide resultant laser light to the display element,
        an optical element of a second system, being different from the optical element of the first system, configured to uniformize an intensity distribution of another of the laser lights emitted from two other of the at least three light sources and guide resultant laser light to the display element,
    the laser lights emitted from the at least two other of the light sources are guided to the optical element of the second system, and
    beam profiles of the laser lights incident on the optical element of the second system are similar to each other compared with the beam profiles of the laser lights incident on the optical element of the first system.

2. The image projection apparatus according to claim 1, wherein
    the illumination optical system
        includes, as the optical element of the first system, a first diffusion plate configured to diffuse the one laser light, and includes, as the optical element of the second system, a second diffusion plate configured to diffuse the other laser light.

3. The image projection apparatus according to claim 1, wherein the illumination optical system
includes, as the optical element of the first system, a first lens array configured to define an illumination region of the one laser light in the display element, and includes, as the optical element of the second system, a second lens array configured to define an illumination region of the other laser light in the display element.

4. The image projection apparatus according to claim 1, comprising an actuator configured to vibrate a supporter, wherein
the optical elements, corresponding to each other, of the first system and the second system are supported by the supporter.

5. The image projection apparatus according to claim 1, comprising, as the display element:

a first display element to which the one laser light is guided; and a second display element to which the other laser light is guided.

6. The image projection apparatus according to claim 5, wherein a plurality of the other laser lights are guided to the second display element, the image projection apparatus comprises a controller configured to control the plurality of light sources, the first display element, and the second display element, and the controller performs emission and modulation of the plurality of the other laser lights in a manner of time division, and sets a duty of the time division in accordance with maximum emission powers of the light sources configured to respectively emit the plurality of the other laser lights.

7. The image projection apparatus according to claim 1, wherein the plurality of light sources are three light sources configured to respectively emit laser lights in red, green, and blue wavelength bands, and the one laser light is laser light in the red wavelength band.

8. The image projection apparatus according to claim 1, wherein the beam profiles, of each of the laser lights, are their respective intensity distributions.

\* \* \* \* \*